Oct. 23, 1956  J. H. STEIN  2,767,616
BOMBING CONTROL
Filed July 4, 1944  2 Sheets-Sheet 1

INVENTOR
James H. Stein
BY
ATTORNEY

INVENTOR.
JAMES H. STEIN

United States Patent Office 2,767,616
Patented Oct. 23, 1956

2,767,616

BOMBING CONTROL

James H. Stein, Garden City, N. Y., assignor to the United States of America as represented by the Secretary of the Navy Application July 4, 1944, Serial No. 543,505

4 Claims. (Cl. 89—1.5)

This invention relates to an improved bombing control, and more particularly to an automatic control adapted for use in releasing bombs or other missiles from an aircraft for the purpose of destroying a magnetic target.

Highly effective systems adapted for indicating the presence of a magnetic body in the proximity of an aircraft have been devised. Certain of these arrangements employ magnetometers of the saturated-core type, the magnetometer element being maintained in alignment with the earth's magnetic field regardless of movements of the aircraft by means of a stabilization system, as for example that disclosed in copending application Serial No. 529,003, filed March 31, 1944, now Patent 2,689,333, issued Sept. 14, 1954, for Magnetic Stabilization System, by Donald G. C. Hare. The signals from two such magnetometers have been employed in the past to provide an indication as to the lateral displacement of the magnetic target with respect to the aircraft, as disclosed in copending application Serial No. 531,422, filed April 17, 1944, now Patent 2,605,341, for Directional Indicator System, by Victor V. Vacquier and John N. Adkins.

Early attempts to apply such detection means to the problem of bombing control included arrangements in which the release of the bomb depended solely upon the amplitude of the magnetometer output signal, the assumption being that this amplitude achieved a maximum value when the aircraft was directly over the magnetic target. Experiments showed, however, that such a simple solution of the problem was not entirely satisfactory.

It was realized early that a single magnetometer was incapable of providing sufficient information to permit accurate automatic bombing control. Furthermore, the relatively high cost and great weight of each bomb made it essential that the automatic system be substantially nonresponsive to magnetic "noise" as distinguished from magnetic anomalies due to the presence of a magnetic target. Another problem which was early encountered was the wide variation in strength of the magnetic field surrounding the target. This unpredictable variation prohibited satisfactory operation based solely upon the magnitude of the magnetometer signals.

It is an object of the present invention to provide an improved bombing control which is substantially nonresponsive to magnetic noise, and which is capable of discriminating between the response which is obtained when passing close to a target having a small magnetic field and that obtained when passing at a distance from a target having a relatively large magnetic field.

In accordance with the present invention, there is provided a method of releasing a missile comprising the steps of deriving a pair of signals related in instantaneous strength to the intensity at two points of the missile carrier of the magnetic anomaly caused by an objective, deriving a sum signal proportional to the sum of the input signals, deriving a difference signal proportional to the difference of the input signals, deriving an output signal which is a function of the ratio of the sum signal to the difference signal, analyzing the characteristics of the input signals, and releasing the missile only when the output signal has a predetermined value and the input signals have desired characteristics.

The invention also contemplates the provision of a system for carrying out the above method comprising, in combination, means for deriving a pair of input signals respectively related in instantaneous strength to the magnetic anomaly caused by an objective relative to which the missile carrier is traveling, means for combining the input signals to provide a sum signal, means for combining the input signals to provide a difference signal, means for combining the sum and difference signals to provide an output signal which is a function of the ratio of the sum signal to the difference signal, means for analyzing the characteristics of the input signal variation during the carrier travel in the vicinity of a magnetic objective and means for releasing the missile only after the output signal exceeds a predetermined value and there is concurrent variation of the input signal through a characteristic cycle portion.

The above and other objects of the invention are achieved by utilizing the signals from a pair of substantially identical magnetometers, the magnetometer elements of which are displaced from each other on a transverse axis of the aircraft. The sensitivity of the arrangement in accordance with the invention is such that the exact displacement of the magnetometer elements is in no sense critical. In general, however, the maximum displacement which can conveniently be achieved is desirable. If the bombing control is installed in an airplane, for example, it is preferable that the magnetometer elements be mounted respectively at or near its wing tips. Where the control is installed in an aircraft of the lighter-than-air type, the magnetometer elements are preferably mounted at either side of the gas bag.

When the magnetic anomaly is relied on for orientation of a missile carrier, such as an aircraft, relative to the objective, the two magnetometers which detect the strength of the anomaly at spaced points are known to yield signals which vary in strength during carrier travel in the vicinity of the objective. The variation is ordinarily different for the two magnetometers. Each signal may have a varying number of unequal excursions (usually two to four) from center or zero, and is usually non-repeating and asymmetric, definitely not in the nature of a periodic wave the phase of which relative to another periodic signal can be ascertained.

Superimposed on the desired signals characteristic of the magnetic anomaly of an objective are additional components known as noise. These noise components may be repeating or transitory, faster or slower than the anomaly component, and in usual practice are weaker than the anomaly component. Through the use of filters as well as by visual analysis of the signal trace when recorded, separation of the desired signal from extraneous components is feasible, as it is to ascertain signal transition through a characteristic part of an excursion. Peaks, inflection points and reversals through center are characteristic parts.

The magnetometer or detector elements are automatically aligned with the resultant magnetic field if constructed in accordance with the copending application Serial No. 529,003, mentioned above. Since the terrestrial field is of a greater order of magnitude than the magnetic anomaly caused by a magnetic objective, the resultant magnetic field has the same direction as the normal earth's field at that geographical point. The magnetometer elements are for all practical purposes parallel. The terrestrial field to which the magnetometer or detector elements are exposed is preferably compensated, or neutralized, as in copending application Serial No. 531,422, mentioned above. Therefore, the anomaly rather than the total resultant field is detected. The term magnetometer includes not only the magnetometer elements, but also the orienting means, the magnetometer element exciting means, and that apparatus necessary for converting the output of the magnetometer element into a signal the strength and polarity of which varies with the total field or the anomaly being investigated.

It will appear from the above that the invention contemplates two separate and distinct criteria for determining whether or not a missile shall be released. The first of these criteria is, in essence, whether or not the signals provided by the magnetometers have such characteristics as clearly to indicate that they are due to the presence of a magnetic target rather than to magnetic noise. The second of the two criteria is whether or not the aircraft has a lateral displacement with respect to the target that would make bombing effective. In accordance with the present invention, this second criterion is determined by setting a lower limit above which the ratio of the sum to the difference of the signals must lie.

For a better understanding of the invention, together with other and further objects thereof, reference is made to the following description taken in connection with the accompanying drawings, and its scope will be pointed out in the appended claims.

Figure 1:
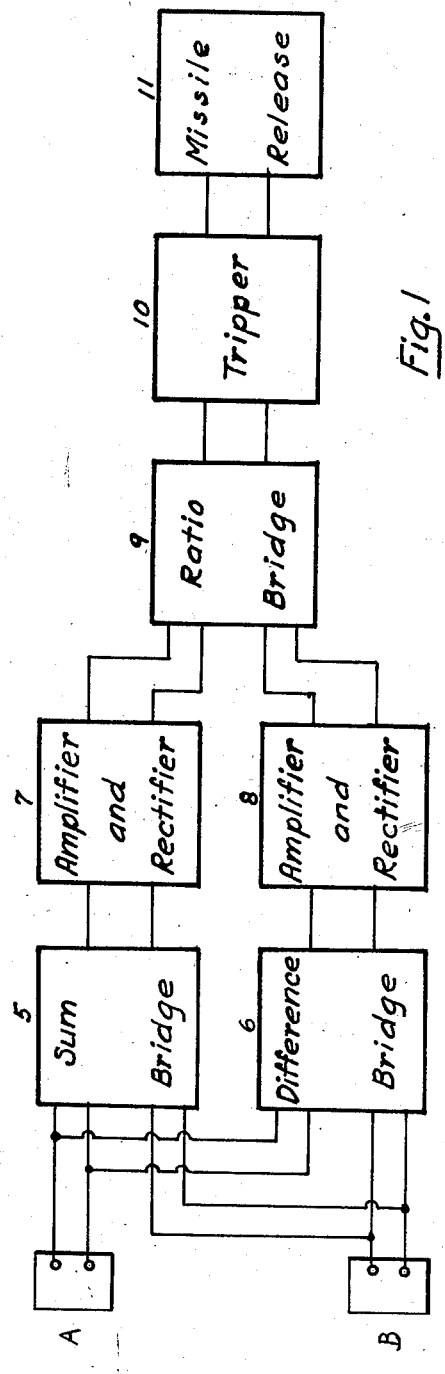
Figure 1 shows, in block form, a bombing control in accordance with the present invention.

Referring now to Figure 1, there is shown a bombing control having two magnetometers A and B. Both magnetometers are connected to sum bridge 5 and to difference bridge 6, with the result that the output of sum bridge 5 comprises a voltage proportional to the sum of the voltages from the magnetometers, whereas the output of difference bridge 6 comprises a voltage proportional to the difference of these two magnetometer signals.

The outputs of sum bridge 5 and difference bridge 6 are supplied, respectively through sum amplifier and rectifier unit 7 and difference amplifier and rectifier unit 8, to ratio bridge 9. The output of ratio bridge 9, which is a function of the ratio of the sum signal to the difference signal, is supplied to tripper unit 10, which in turn is connected to missile-release unit 11.

In operation, a pair of magnetometers, which are not shown but which are preferably of the saturated-core type, having their elements displaced laterally on the aircraft and each having its output circuit balanced with respect to ground, are connected as shown. A voltage proportional to the sum of the two magnetometer output voltages appears at the output of amplifier and rectifier unit 7, and a voltage proportional to their difference is developed at the output of amplifier and rectifier unit 8. When these sum and difference voltages are applied to ratio bridge 9, the result is an output signal the magnitude of which is a function of the ratio of the sum voltage to the difference voltage, and the characteristics of which are substantially those of the magnetometer output voltages. This output signal is then applied to tripper unit 10, which preferably but not necessarily is arranged and functions as a peak tripper in accordance with the disclosure of copending application Serial No. 547,477, filed July 31, 1944, for Tripper System, by Otto H. Schmitt. When this output signal exceeds a predetermined value and when it has desired characteristics, missile-release unit 11 is caused to release a missile.

It will be apparent that, in the arrangement of Figure 1, the tripper, which comprises means for analyzing the characteristics of the magnetometer output signals, is effectively in cascade with the main signal path. It is within the scope of the invention, however, to locate the tripper effectively in parallel with the main signal path. Such a modification is shown in Figure 2 of the drawings, in which like components are designated by the same reference numerals.

Figure 2:
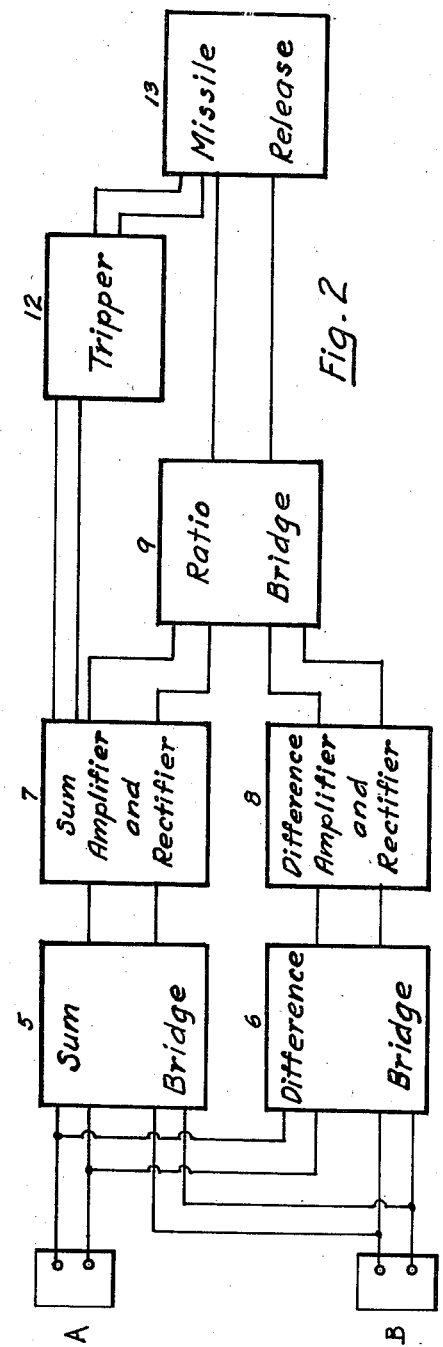
Figure 2 shows, also in block form, a modified arrangement of the bombing control of Figure 1.

Referring now to Figure 2, it will be observed that tripper unit 12, instead of being interposed between the ratio bridge and the missile-release unit, is supplied directly from the sum amplifier and rectifier unit 7, preferably before rectification of the sum signal. The output of tripper unit 12 is connected to missile-release unit 13, as is also the output of ratio bridge 9.

In operation, ratio bridge 9 supplies an output signal which must exceed a predetermined value before missile-release unit 13 can function to release a bomb. Tripper unit 12, which in effect analyzes the characteristics of the sum signal at the output of unit 7, must also supply the proper signal to missile-release unit 13 before the latter unit functions to release a bomb. When both of these conditions are fulfilled, a bomb is released.

The modification of Figure 2 has the advantage that tripper unit 12 is supplied with a relatively undistorted signal having substantially the characteristics of the magnetometer output signals. In this modification, tripper unit 12 may be of the type disclosed in the above-mentioned application Serial No. 547,477, filed July 31, 1944, for Tripper System, by Otto H. Schmitt, or of any other suitable type, as for example that disclosed in copending application Serial No. 543,494, filed July 4, 1944, now Patent 2,640,926, issued June 2, 1953, for Automatic Release and Reset System, by William I. L. Wu.

Figure 3:
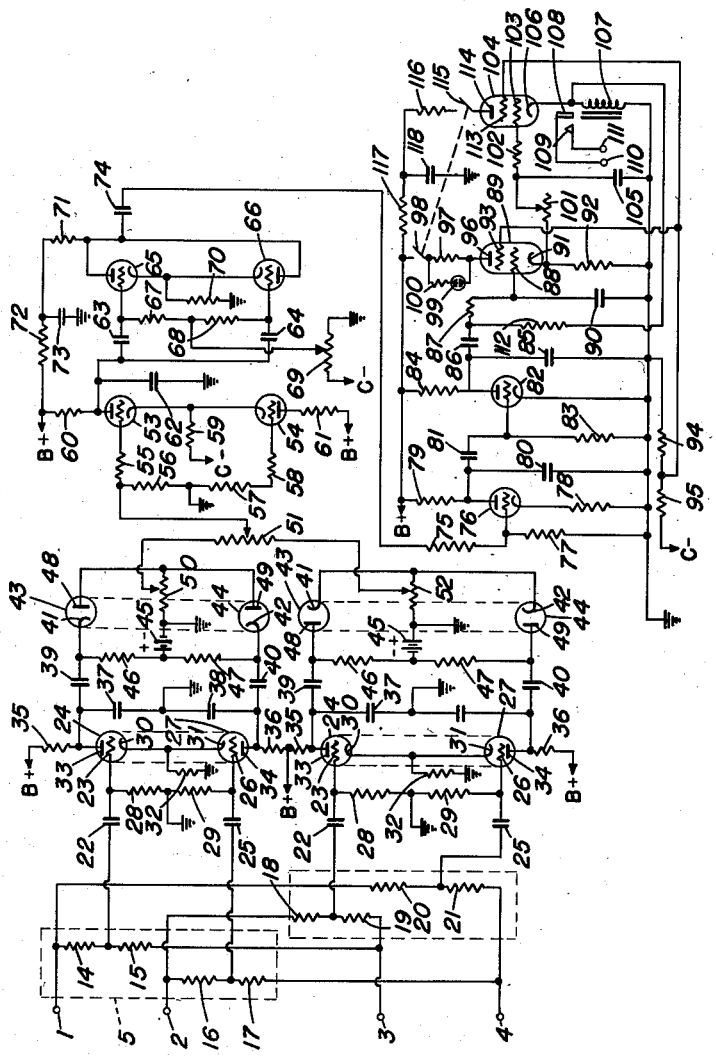
Figure 3 shows, in schematic form, a particular embodiment of the bombing control of Figure 1, omitting the magnetometers.

Referring now to Figure 3 of the drawings, there is shown in detail a particular embodiment of the bombing control of Figure 1. In Figure 3, each pair of input terminals 1—2 and 3—4 from the respective magnetometers, not shown in this figure, is connected to sum bridge 5 comprising resistors 14, 15, 16 and 17, and to difference bridge 6 comprising resistors 18, 19, 20 and 21. The junction of resistors 14 and 15 is connected, through capacitor 22, to control grid 23 of vacuum tube 24. Likewise, the junction of resistors 16 and 17 is connected, through capacitor 25, to control grid 26 of vacuum tube 27. Control grids 23 and 26 are grounded respectively through resistors 28 and 29. Cathodes 30 and 31 of vacuum tubes 24 and 27 are grounded through resistor 32. Plates 33 and 34 of vacuum tubes 24 and 27 are connected, respectively through resistors 35 and 36, to a source of positive potential indicated by B+. The plates are also bypassed to ground by means of capacitors 37 and 38.

Plates 33 and 34 of vacuum tubes 24 and 27 are also connected, through capacitors 39 and 40, to cathodes 41 and 42 of vacuum tubes 43 and 44. Cathodes 41 and 42 are maintained at a positive potential with respect to ground by means of battery 45 and resistors 46 and 47. Plates 48 and 49 of vacuum tubes 43 and 44 are connected together and, through potentiometer 50, to ground. The moving arm of potentiometer 50 is connected to one terminal of potentiometer 51.

The junctions of resistors 18 and 19 and of resistors 20 and 21 are connected to an amplifier and rectifier system substantially identical with that just described (like components being designated by the same reference numerals), except that the polarity of battery 45 is reversed and rectifier tubes 43 and 44 each have their respective terminals reversed, so that cathodes 41 and 42 are connected together and, through potentiometer 52, to ground. The moving arm of potentiometer 52 is connected to the free terminal of potentiometer 51. Potentiometers 50, 51 and 52 in combination serve as a ratio bridge for combining the sum and difference signals to derive a single output signal.

The moving arm of potentiometer 51 is connected to the input terminal of an amplifying stage comprising vacuum tubes 53 and 54, input resistors 55, 56, 57 and 58, cathode resistor 59, and load resistors 60 and 61. The common cathode circuit of tubes 53 and 54 is returned to a source of negative potential indicated by C—. The plate circuits of vacuum tubes 53 and 54 are completed by connections from resistors 60 and 61 to B+. Capacitor 62 is connected between the plate of vacuum tube 53 and ground. The plate of this tube is also connected, through capacitors 63 and 64, to the control grids of vacuum tubes 65 and 66, these control grids also being connected, respectively through resistors 67 and 68, to the moving arm of potentiometer 69 which is connected between ground and C—. The cathodes of vacuum tubes 65 and 66 are grounded through resistor 70. The plates of these tubes are connected together and, through load resistor 71 and filter resistor 72, to B+. The junction of resistors 71 and 72 is bypassed to ground by filter capacitor 73.

The plates of vacuum tubes 65 and 66 are also connected, through capacitor 74 and resistor 75, to the control grid of vacuum tube 76, this control grid being grounded through resistor 77. The cathode of vacuum tube 76 is grounded through resistor 78. The plate of this tube is connected through resistor 79 to B+, and is bypassed to ground by means of capacitor 80. The plate of vacuum tube 76 is also connected, through capacitor 81, to the control grid of vacuum tube 82, this control grid being grounded through resistor 83. The cathode of vacuum tube 82 is connected directly to ground, and its plate is connected through resistor 84 to B+ and is bypassed to ground by capacitor 85.

The plate of vacuum tube 82 is also connected, through capacitor 86 and resistor 87 in series, to control grid 88 of gas-discharge tube 89. Control grid 88 is bypassed to ground by capacitor 90, and cathode 91 of tube 89 is connected to ground through resistor 92. Shield grid 93 is connected to the junction of resistors 94 and 95, which in turn are connected in series between ground and C—. Plate 96 of tube 89 is connected, through resistor 97 and switch 98, to B+. Resistor 97 is bypassed by neon tube 99 and resistor 100 in series.

Cathode 91 of tube 89 is connected, through rheostat 101 and resistor 102 in series, to control grid 103 of gas-discharge tube 104. The junction of rheostat 101 and resistor 102 is bypassed to ground by capacitor 105. Cathode 106 of tube 104 is grounded through relay winding 107. Contacts 108 and 109 of the same relay are connected to output terminals 110 and 111, respectively. Cathode 106 of tube 104 is also connected, through resistor 112, to the junction of capacitor 86 and resistor 87. Shield grid 113 of tube 104 is connected to the junction of resistors 94 and 95. Plate 114 of tube 104 is connected, through switch 115 and resistors 116 and 117, to B+. Switch 115 is ganged for simultaneous operation with switch 98, as indicated. The junction of resistors 116 and 117 is bypassed to ground by capacitor 118.

In operation, a pair of magnetometers are connected respectively to input terminals 1—2 and 3—4. The signal at the output of sum bridge 5, which is proportional to the sum of the magnetometer signals, is amplified by vacuum tubes 24 and 27 operating in Class A, and applied to vacuum tubes 43 and 44 which together function as a full-wave rectifier. A voltage negative with respect to ground is developed across potentiometer 50, this voltage being a rectified version of the output voltage of sum bridge 5. Likewise, the difference signal which appears at the output of difference bridge 6 is amplified by a second pair of vacuum tubes 24 and 37 and rectified by a second pair of vacuum tubes 43 and 44, to produce a rectified voltage which is positive with respect to ground across potentiometer 52.

Selected portions of the voltages appearing across potentiometers 50 and 52 are applied respectively to the terminals of potentiometer 51, so that the voltage appearing across the latter potentiometer corresponds to the algebraic sum of the selected portions. In practice, potentiometers 50, 51 and 52 are so adjusted that, when the ratio of the sum signal to the difference signal exceeds a predetermined critical value, the voltage at the arm of potentiometer 51 will be negative with respect to ground; otherwise this voltage is zero or positive. As will be more fully explained below, the voltage at this point must be negative before a missile can be released.

The signal appearing at the arm of potentiometer 51 as thus selected is applied to vacuum tube 53, which functions as a Class A amplifier. The purpose of vacuum tube 54 is to reduce the degenerative effect of relatively large cathode resistor 59 upon the signal voltage. The use of this vacuum tube is optional, and it may be omitted provided the cathode circuit of vacuum tube 53 is suitably altered. The output signal from this amplifying stage is applied to vacuum tubes 65 and 66, which together function as a clipper. Being biased substantially to cutoff, this clipper responds only to positive signals. The threshold of the clipper is adjusted to a desired value by means of potentiometer 69, which varies the negative bias applied to the control grids of vacuum tubes 65 and 66. Relatively large cathode resistor 70 permits the clipper to handle large signals without overloading. This advantage is achieved at the expense of voltage gain which, in this case, is not required.

The signal at the output of the clipper stage is applied to vacuum tube 76, which functions as a Class A amplifier. The output of this stage is connected, through capacitor 81, to the control grid of vacuum tube 82. This stage functions to take the derivative of the signal, in such a manner that a positive signal at the plate of vacuum tube 76 produces, just as its slope passes through zero, a relatively large positive pulse at the plate of vacuum tube 82. Such a positive pulse causes gas-discharge tube 89 to become conductive, thus generating a large positive pulse across its cathode resistor 92 and, at the same time, causing neon tube 99 to glow due to the large voltage drop across load resistor 97.

The positive pulse developed at cathode 91 of gas-discharge tube 89 is applied, through an adjustable time-delay network comprising rheostat 101 and capacitor 105, to control grid 103 of gas-discharge tube 104. This pulse causes tube 104 to become conductive, thereby energizing relay winding 107 with the result that contacts 108 and 109 are closed. This in turn causes a missile-releasing device, not shown, connected to terminals 110 and 111, to release its missile.

The purpose of the connection between cathode 106 of tube 104 and the control-grid circuit of tube 89 is so that, in the event that tube 104 is accidentally discharged, tube 89 will also be discharged and neon tube 99 will indicate that resetting is required. Resetting is accomplished by momentarily opening normally closed ganged switches 98 and 115, thus removing the plate voltage from tubes 89 and 104.

It will be observed from the above explanation that the clipper stage comprising vacuum tubes 65 and 66 responds only to a positive signal, provided this signal exceeds a predetermined threshold value depending upon the setting of potentiometer 69. Due to the phase reversal which occurs in the amplifying stage comprising vacuum tubes 53 and 54, therefore, the derived signal voltage which is developed at the arm of potentiometer 51 must be negative with respect to ground. It must also have a predetermined minimum amplitude. Such a negative voltage is developed only in the event that the portion of the sum voltage appearing at the arm of potentiometer 51 sufficiently exceeds the portion of the difference voltage appearing at the same point. This is the condition which must be realized before the bombing control becomes operative, and it has been found that this condition is in fact realized, regardless of the instantaneous polarities of the magnetometer output signals which are applied to terminals 1—2 and 3—4, only when the carrier has a lateral displacement not exceeding predetermined limits with respect to the peak of the magnetic anomaly, and when the carrier is near enough the magnetic anomaly so that the magnetometer output signals are of sufficient magnitude.

It will also be observed from the above description of operation that release of a missile depends not only on the relative magnitudes of the magnetometer signals applied to input terminals 1—2 and 3—4, but also upon their characteristics. Discrimination in this respect is achieved, in this embodiment by way of example, by virtue of the operation of vacuum tube 82 and gas-discharge tubes 89 and 104, together with their associated apparatus, as a peak tripper. In other words, even though a signal of the proper polarity and of sufficient magnitude to pass through the clipper stage comprising vacuum tubes 65 and 66 is obtained, no missile will be released until this signal achieves its maximum or peak value and begins to reverse in slope. Such operation of a peak tripper is disclosed and more fully explained in copending application Serial No. 547,477, filed July 31, 1944 for Tripper System, by Otto H. Schmitt. Trippers responsive to other characteristics of the signal may alternatively be used if desired, without departing from the scope of the present invention.

In one successful embodiment of the invention in accordance with Figure 3, vacuum tubes 24, 27, 53, 54, 65, 66, 76 and 82 each comprised one half of a type 12SL7 tube. Vacuum tubes 43 and 44 each comprised one half of a type 6H6 tube. Gas-discharge tubes 89 and 104 each comprised a type 2050 tube. Neon tube 99 had a rating of one-half watt. Relay winding 107 had a resistance of 5,000 ohms. Batteries 45 each had a voltage of 3 bolts with the polarities indicated, the source indicated by B+ had a positive voltage of 180 volts, and the source indicated by C— a negative voltage of 45 volts. Other circuit components had the following values:

| Component | Value |
|---|---|
| Resistors 14, 15, 16, 17, 35, 36, 60, 61, 79 ___megohm__ | 0.25 |
| Resistors 18, 19, 20, 81, 83, 87, 102 ___do___ | 0.5 |
| Resistors 28, 29, 46, 47, 55, 56, 57, 58, 67, 68 ___megohms__ | 2.0 |
| Resistors 32 ___ohms___ | 2500 |
| Resistor 59 ___do___ | 65,000 |
| Resistors 70, 71, 77, 84, 94, 97, 117 ___megohm__ | 0.1 |
| Resistor 72 ___ohms__ | 25,000 |
| Resistors 75, 112 ___megohm__ | 1.0 |
| Resistors 78, 92 ___ohms__ | 2,000 |
| Resistor 95 ___megohm__ | 0.4 |
| Resistor 100 ___ohms__ | 50,000 |
| Resistor 116 ___do___ | 40,000 |
| Capacitors 22, 25 ___microfarads__ | 4.0 |
| Capacitors 37, 38, 80, 85 ___do___ | 0.1 |
| Capacitors 39, 40, 63, 64, 74 ___do___ | 2.0 |
| Capacitor 62 ___do___ | 0.2 |
| Capacitors 73, 118 ___do___ | 20 |
| Capacitor 81 ___do___ | 0.5 |
| Capacitors 86, 105 ___do___ | 1.0 |
| Capacitor 90 ___do___ | 0.01 |
| Potentiometers 50, 52 ___megohms__ | 2.0 |
| Potentiometer 51 ___do___ | 1.0 |
| Potentiometer 69 ___do___ | 0.5 |
| Rheostat 101 ___do___ | 3.0 |

It will be understood that tube types and component values different from those stated above may be employed without departing from the scope of the invention. For example, separate vacuum tubes may be employed instead of double triodes and double diodes such as those mentioned above by way of example.

What is claimed is:

1. The combination of control means with means for releasing a missile from a carrier for destruction of a magnetic objective, said control means comprising means for deriving a pair of signals the instantaneous strengths of both of which are related in the same way to the respective intensities of the magnetic anomaly of the objective at laterally spaced points on the carrier, means for determining when the ratio of the sum of said signals to their difference exceeds a predetermined minimum, said last named means being arranged to prevent operation of said missile release means unless an acceptable ratio has been determined.

2. Apparatus for releasing a missile from a carrier for destruction of a magnetic objective comprising a pair of magnetometers including two laterally spaced magnetometer elements each aligned with the resultant magnetic field and arranged to yield a signal proportional to the strength of the objective anomaly at its respective location, means effective during travel of the carrier in the vicinity of the objective for determining the time of signal transition through a predetermined portion of an excursion, means for determining whether the ratio of the sum of said signals to their difference exceeds a predetermined minimum at the time of said transition, and means jointly controlled by said transition and ratio determining means for releasing a missile at a time predetermined in relation to concurrence of acceptable transition and ratio results.

3. Apparatus for controlling the release of a missile from a carrier for destruction of a magnetic objective comprising means for generating a pair of signals the instantaneous strengths of both of which are related in the same way to the respective intensities of the magnetic anomaly caused by the objective at two spaced points on the carrier, the signals inherently including undesired noise components, means for determining the times during the travel of the carrier in the vicinity of the objective when the ratio of the sum of the signals to their difference exceeds a predetermined minimum, means for separating signal excursions characteristic of an objective anomaly from those due to magnetic noise, and missile releasing means jointly controlled by said ratio determining means and said signal analyzing means.

4. Apparatus for controlling the release of missile from a carrier for destruction of a magnetic objective comprising means for providing a pair of signals the instantaneous strengths of both of which are related in the same way to the respective intensities of the magnetic anomaly caused by the objective at spaced points on the carrier, the signals inherently containing foreign noise components, means for determining the times during the travel of the carrier in the vicinity of the objective when the ratio of the sum of said signals to their difference exceeds a predetermined minimum value, analyzing means for excluding noise components in the signal variation and for detecting signal transition through a characteristic part of a signal excursion, and means for releasing a missile from a carrier at a time predetermined in relation to concurrence of acceptable ratio and analysis results.

References Cited in the file of this patent

UNITED STATES PATENTS

| | | |
|---|---|---|
| 1,968,068 | Blanchard | July 31, 1934 |
| 2,166,991 | Guanella | July 25, 1939 |